US011817926B2

(12) United States Patent
Gopal et al.

(10) Patent No.: US 11,817,926 B2
(45) Date of Patent: Nov. 14, 2023

(54) TECHNIQUES FOR ANTENNA SWITCHED DIVERSITY MANAGEMENT

(71) Applicant: QUALCOMM Incorporated, San Diego, CA (US)

(72) Inventors: Thawatt Gopal, San Diego, CA (US); Sridhar Bandaru, Westminster, CO (US); Brian Clarke Banister, San Diego, CA (US); Reza Shahidi, San Diego, CA (US); Troy Curtiss, Boulder, CO (US); Akhil Deodhar, Louisville, CO (US); Lin Lu, San Diego, CA (US); Jagadish Nadakuduti, Mission Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/448,651

(22) Filed: Sep. 23, 2021

(65) Prior Publication Data

US 2022/0103214 A1 Mar. 31, 2022

Related U.S. Application Data

(60) Provisional application No. 63/198,110, filed on Sep. 29, 2020.

(51) Int. Cl.
*H04B 7/06* (2006.01)
*H04B 7/0456* (2017.01)

(52) U.S. Cl.
CPC ......... *H04B 7/0602* (2013.01); *H04B 7/0465* (2013.01); *H04B 7/0623* (2013.01)

(58) Field of Classification Search
CPC .. H04B 7/0602; H04B 7/0465; H04B 7/0623; H04B 7/0608; H04W 88/02; H04W 52/24; H04W 52/367

(Continued)

(56) References Cited

U.S. PATENT DOCUMENTS 9,215,000 B2 * 12/2015 Mujtaba ............... H04B 1/1027
9,622,187 B2    4/2017 Logan et al.
(Continued)

FOREIGN PATENT DOCUMENTS

EP    1239609 A2    9/2002
EP    1533919 A2    5/2005
(Continued)

OTHER PUBLICATIONS

International Search Report and Written Opinion—PCT/US2021/071580—ISA/EPO—dated Jan. 12, 2022.

*Primary Examiner* — Tanmay K Shah
(74) *Attorney, Agent, or Firm* — Dalei Dong; Harrity & Harrity, LLP

(57) ABSTRACT

Various aspects of the present disclosure generally relate to wireless communication. In some aspects, an apparatus may determine a time-averaged power limit of a set of antennas. The apparatus may modify an antenna switching configuration based at least in part on the time-averaged power limit. The apparatus may transmit a signal using an antenna, from the set of antennas, associated with the modified antenna switching configuration, wherein the antenna is associated with a higher power limit than one or more other antennas. Numerous other aspects are described.

30 Claims, 10 Drawing Sheets

(58) Field of Classification Search
USPC .......................................................... 375/262
See application file for complete search history.

(56) References Cited

U.S. PATENT DOCUMENTS

| | | |
|---|---|---|
| 10,110,267 B2 | 10/2018 | Kim et al. |
| 10,965,335 B1 | 3/2021 | Jadhav et al. |
| 2013/0223551 A1* | 8/2013 | Boccardi .............. H04B 7/0626 375/267 |
| 2021/0067209 A1 | 3/2021 | Gopal et al. |

FOREIGN PATENT DOCUMENTS

| | | | | |
|---|---|---|---|---|
| EP | 2410661 A1 * | 1/2012 | ........... | H04B 1/3838 |
| EP | 2410661 A1 | 1/2012 | | |

\* cited by examiner

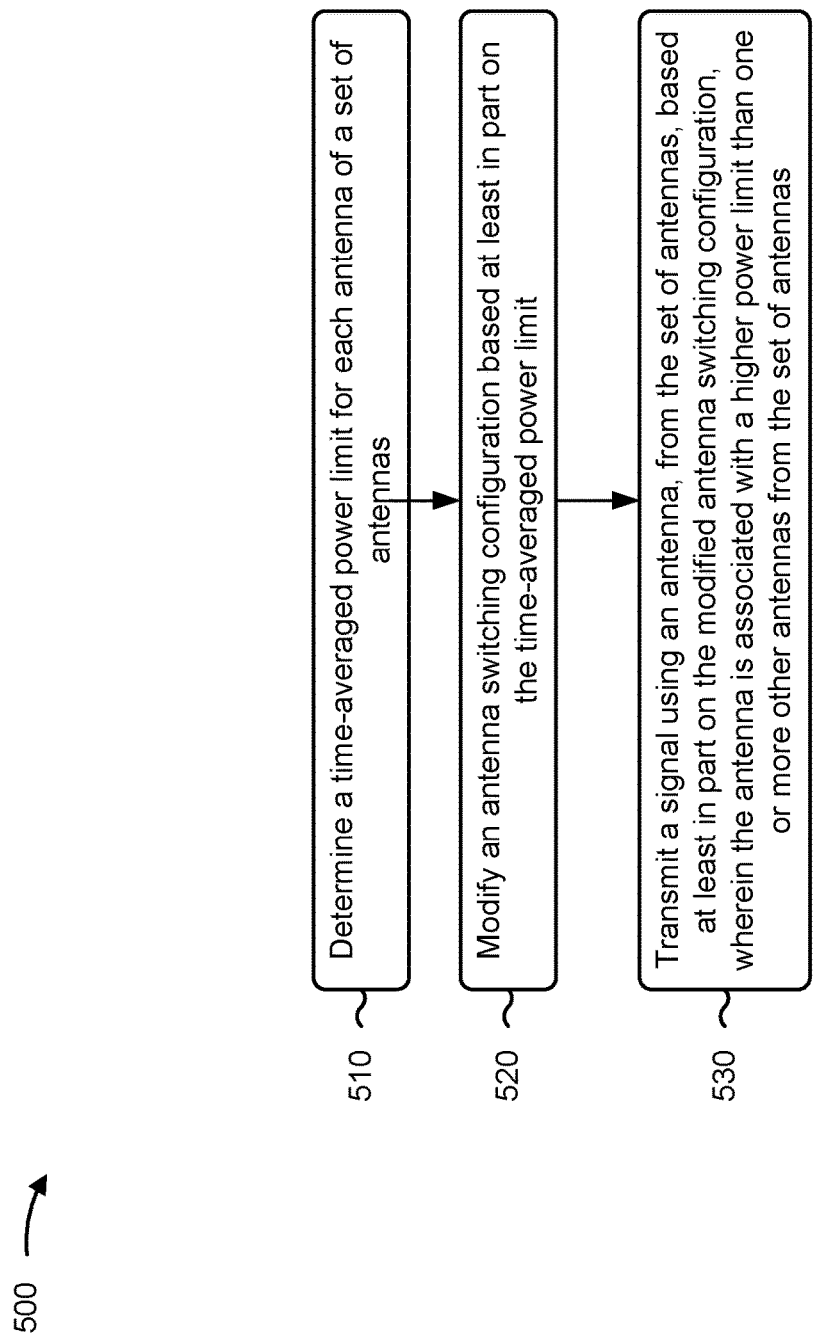

TECHNIQUES FOR ANTENNA SWITCHED DIVERSITY MANAGEMENT

CROSS-REFERENCE TO RELATED APPLICATION

This patent application claims priority to U.S. Provisional Patent Application No. 63/198,110, filed on Sep. 29, 2020, entitled "TECHNIQUES FOR ANTENNA SWITCHED DIVERSITY MANAGEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for antenna switched diversity management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a transmitter device for wireless communication. The transmitter device may include a memory and one or more processors coupled to the memory. The one or more processors may be configured to determine a time-averaged power limit for each antenna of a set of antennas. The one or more processors may be configured to modify an antenna switching configuration based at least in part on the time-averaged power limit. The one or more processors may be configured to transmit a signal using an antenna, from the set of antennas, based at least in part on the modified antenna switching configuration, wherein the antenna is associated with a higher power limit than one or more other antennas from the set of antennas.

Some aspects described herein relate to a method of wireless communication performed by a transmitter device. The method may include determining a time-averaged power limit for each antenna of a set of antennas. The method may include modifying an antenna switching configuration based at least in part on the time-averaged power limit. The method may include transmitting a signal using an antenna, from the set of antennas, based at least in part on the modified antenna switching configuration, wherein the antenna is associated with a higher power limit than one or more other antennas from the set of antennas.

Some aspects described herein relate to a non-transitory computer-readable medium that stores a set of instructions for wireless communication by a transmitter device. The set of instructions, when executed by one or more processors of the transmitter device, may cause the transmitter device to determine a time-averaged power limit for each antenna of a set of antennas. The set of instructions, when executed by one or more processors of the transmitter device, may cause the transmitter device to modify an antenna switching configuration based at least in part on the time-averaged power limit. The set of instructions, when executed by one or more processors of the transmitter device, may cause the transmitter device to transmit a signal using an antenna, from the set of antennas, based at least in part on the modified antenna switching configuration, wherein the antenna is associated with a higher power limit than one or more other antennas from the set of antennas.

Some aspects described herein relate to an apparatus for wireless communication. The apparatus may include means for determining a time-averaged power limit for each antenna of a set of antennas. The apparatus may include means for modifying an antenna switching configuration based at least in part on the time-averaged power limit. The apparatus may include means for transmitting a signal using an antenna, from the set of antennas, based at least in part on the modified antenna switching configuration, wherein the antenna is associated with a higher power limit than one or more other antennas from the set of antennas.

Some aspects described herein relate to a transmitter device for wireless communication. The transmitter device may include a memory and one or more processors coupled to the memory. The one or more processors may be configured to determine a time-averaged power limit of a set of antennas. The one or more processors may be configured to modify an antenna switching configuration based at least in part on the time-averaged power limit. The one or more processors may be configured to transmit a signal using an antenna, from the set of antennas, associated with the modified antenna switching configuration, wherein the antenna is associated with a higher power limit than one or more other antennas.

Some aspects described herein relate to a method of wireless communication performed by a transmitter device. The method may include determining a time-averaged power limit of a set of antennas. The method may include modifying an antenna switching configuration based at least in part on the time-averaged power limit. The method may include transmitting a signal using an antenna, from the set of antennas, associated with the modified antenna switching configuration, wherein the antenna is associated with a higher power limit than one or more other antennas.

Some aspects described herein relate to a non-transitory computer-readable medium that stores a set of instructions for wireless communication by a transmitter device. The set of instructions, when executed by one or more processors of the transmitter device, may cause the transmitter device to determine a time-averaged power limit of a set of antennas. The set of instructions, when executed by one or more processors of the transmitter device, may cause the transmitter device to modify an antenna switching configuration based at least in part on the time-averaged power limit. The set of instructions, when executed by one or more processors of the transmitter device, may cause the transmitter device to transmit a signal using an antenna, from the set of antennas, associated with the modified antenna switching configuration, wherein the antenna is associated with a higher power limit than one or more other antennas.

Some aspects described herein relate to an apparatus for wireless communication. The apparatus may include means for determining a time-averaged power limit of a set of antennas. The apparatus may include means for modifying an antenna switching configuration based at least in part on the time-averaged power limit. The apparatus may include means for transmitting a signal using an antenna, from the set of antennas, associated with the modified antenna switching configuration, wherein the antenna is associated with a higher power limit than one or more other antennas.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-7 are diagrams illustrating example processes associated with antenna switched diversity management, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
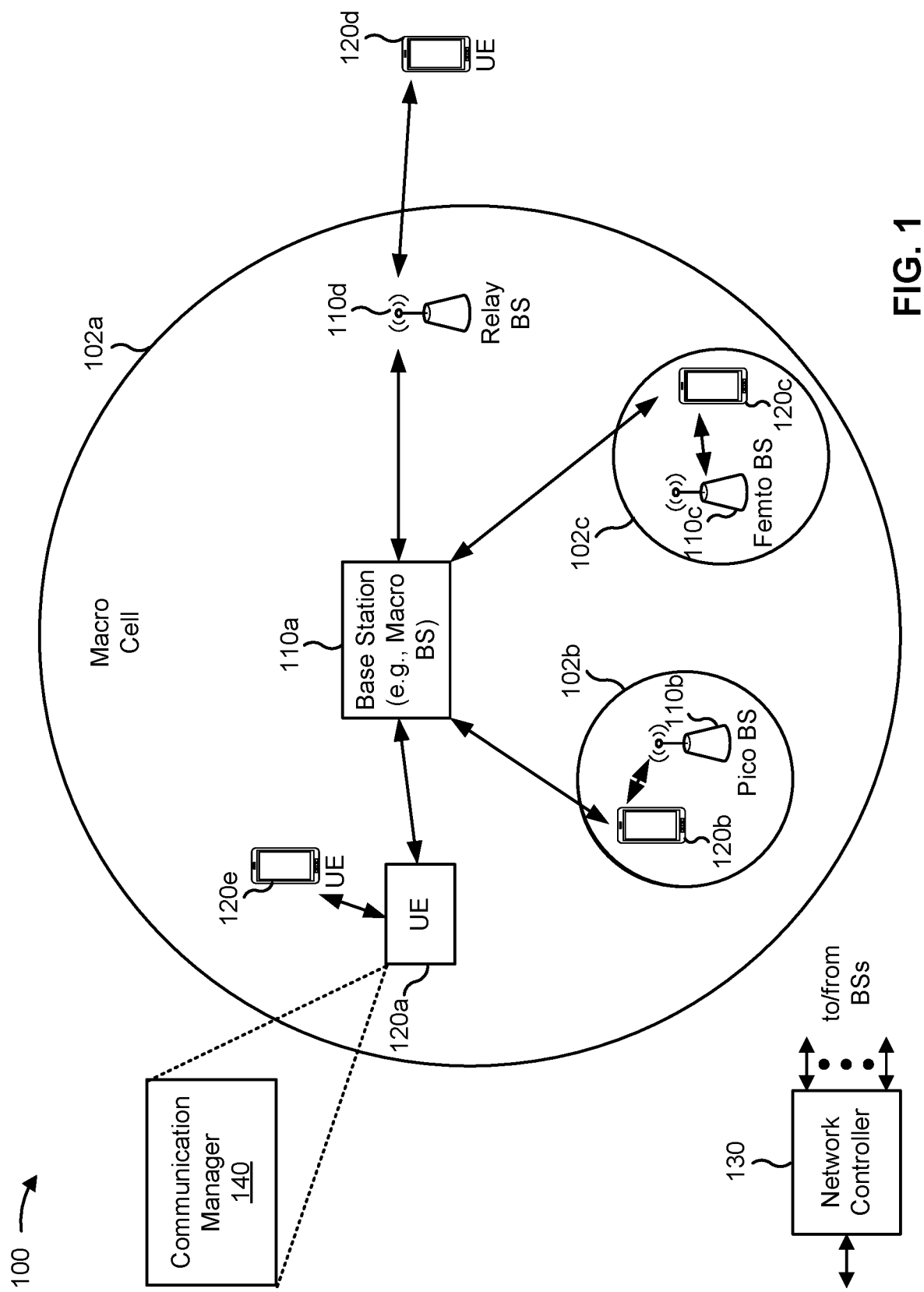
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges. Some aspects described herein may include operation in concurrent bands, such as concurrent sub-6 GHz and greater than 6 GHz (e.g., mmWave) bands.

In some aspects, a transmitter device (e.g., the UE 120) may include a communication manager 140. As described in more detail elsewhere herein, the communication manager 140 may determine a time-averaged power limit of a set of antennas; modify an antenna switching configuration based at least in part on the time-averaged power limit; and transmit a signal using an antenna, from the set of antennas, associated with the modified antenna switching configuration, wherein the antenna is associated with a higher power limit than one or more other antennas. Additionally, or alternatively, the communication manager 140 may perform one or more other operations described herein.

As indicated above, FIG. 1 is provided as an example. Other examples may differ from what is described with regard to FIG. 1.

Figure 2:
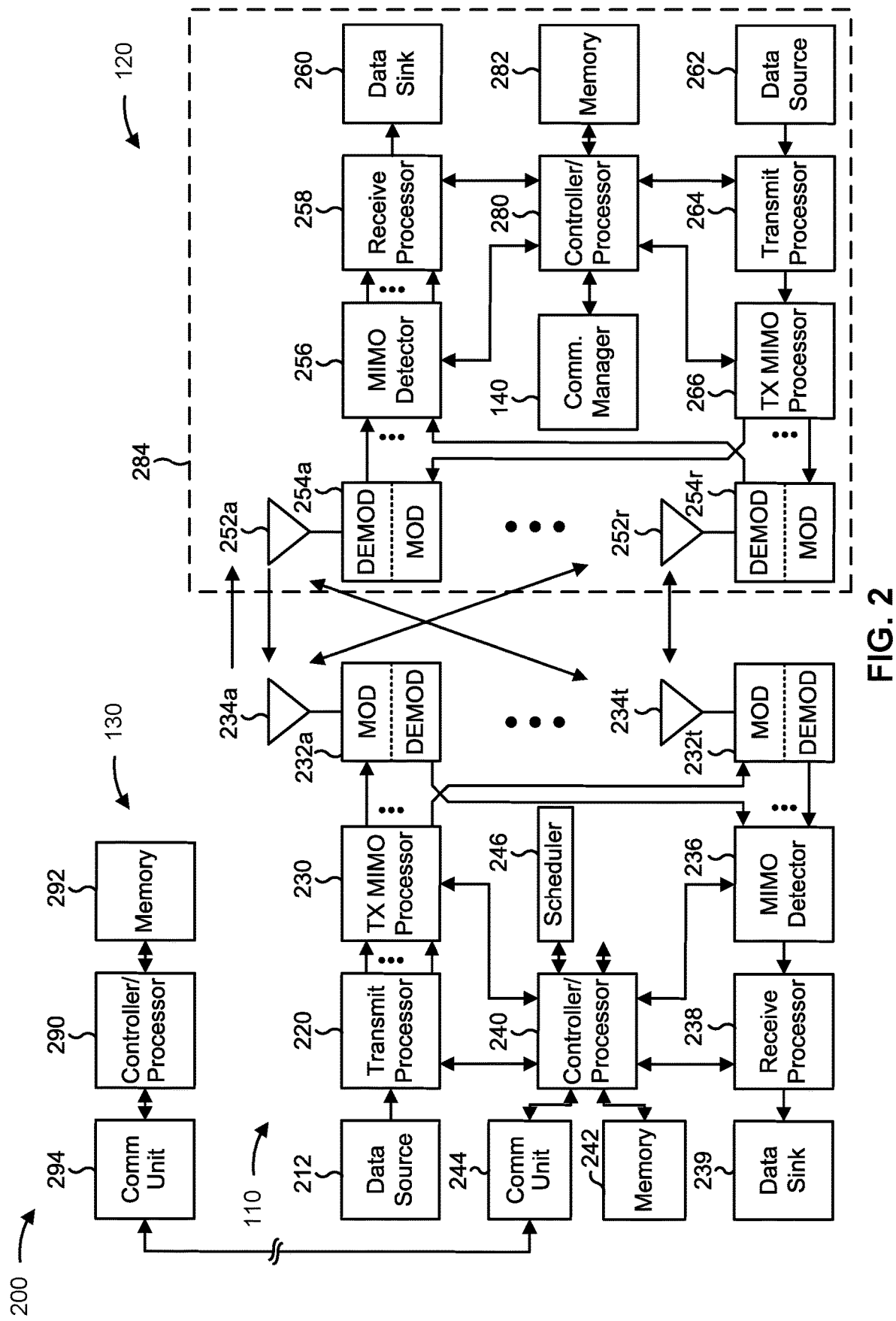
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-8).

The controller/processor 240 of the base station 110, the controller/processor 280 of the UE 120, and/or any other component(s) of FIG. 2 may perform one or more techniques associated with antenna switched diversity management, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, or process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, or process 700 of FIG. 7, and/or other processes as described herein. In some examples, executing instructions may include running the instructions, converting the instructions, compiling the instructions, and/or interpreting the instructions, among other examples.

In some aspects, a transmitter device, such as the UE 120, includes means for determining a time-averaged power limit of a set of antennas; means for modifying an antenna switching configuration based at least in part on the time-averaged power limit; and/or means for transmitting a signal using an antenna, from the set of antennas, associated with the modified antenna switching configuration, wherein the antenna is associated with a higher power limit than one or more other antennas. In some aspects, the means for the transmitter device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
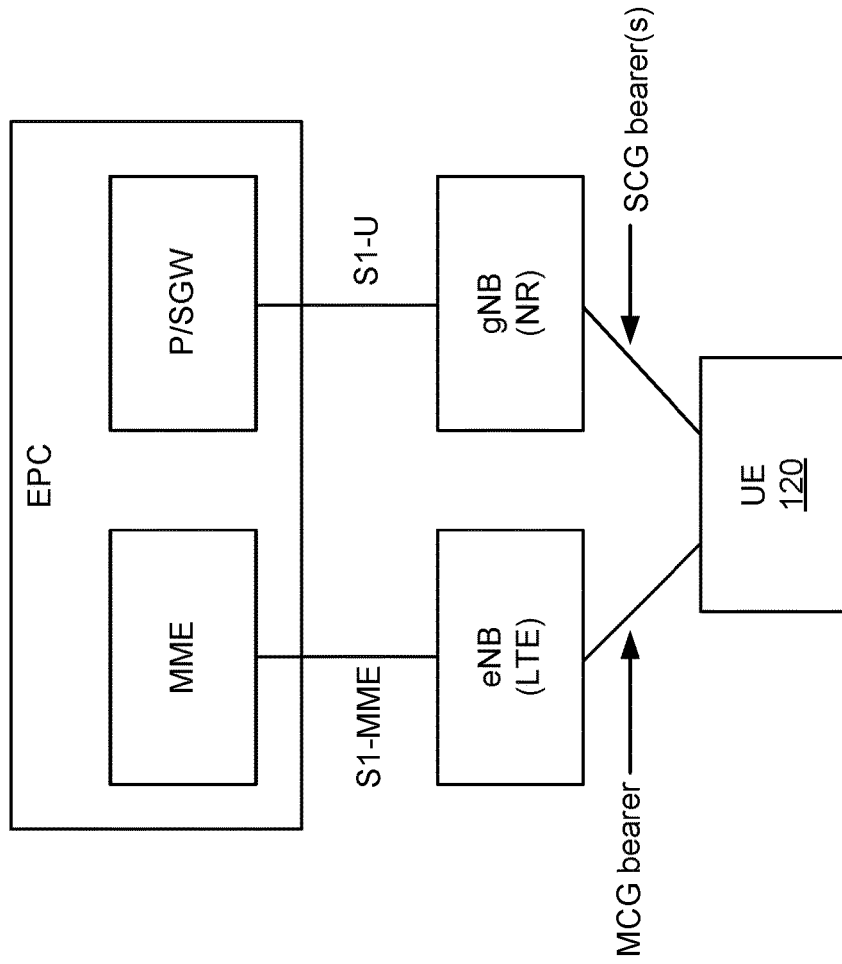
FIG. 3 is a diagram illustrating an example of dual connectivity, in accordance with the present disclosure.

FIG. 3 is a diagram illustrating an example 300 of dual connectivity, which may be applicable one or more techniques associated with antenna switched diversity management, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), a multi-subscriber information module (MSIM) mode (e.g., an MSIM dual-receive, dual-SIM, dual-standby (DR-DSDS) or dual-SIM dual active (DSDA) mode), a single SIM (SSIM) mode (e.g., an SSIM standalone mode associated with an NR, LTE, wideband CDMA (WCDMA), 1×, global system for mobile communication (GSM), etc. RAT), or another dual connectivity mode (e.g., where the MCG is associated with a first RAT and the SCG is associated with one of the first RAT or a second RAT). Additionally, or alternatively, aspects described herein may apply to one or more carrier aggregation (CA) modes, such as NR inter-band uplink CA (UL-CA), LTE inter-band UL-CA, ENDC LTE CA, or NR sub-6 GHz (NRsub6) CA, among other examples. The ENDC mode is sometimes referred to as an NR or 5G non-standalone (NSA) mode. Thus, as used herein, "dual connectivity mode" may refer to an ENDC mode, a NEDC mode, an NRDC mode, and/or another type of dual connectivity mode. Although dual connectivity is described in terms of an ENDC mode, in other dual connectivity modes, a UE 120 may communicate on another type of RAT, such as a Bluetooth RAT, a WLAN, an ultra-wideband (UWB) RAT, a Sub6 RAT, among other examples. Further more, although some aspects are described herein in terms of dual connectivity, aspects described herein may apply to non-dual connectivity use cases.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

In some communications systems, a transmitter device, such as a UE (e.g., which may have 2 antennas, 4 antennas, or another number of antennas), may use antenna switched diversity (Asdiv) to select from a plurality of different antenna switching configurations. For example, a transmitter device may select one or more of the plurality of antennas to use for a transmission. This allows the transmitter device to overcome connectivity issues, such as when a hand or head of a user of the transmitter device is positioned in such a way as to block an antenna. For example, when a user's hand covers a first antenna at a first location on the transmitter device, the transmitter device may detect connectivity issues with the first antenna and may select a second antenna that is not covered by the user's hand and that is not subject to the connectivity issues. In other examples, the transmitter device may use Asdiv to overcome antenna imbalances or radio propagation shadowing effects, among other examples of issues that the transmitter device may use Asdiv to overcome.

When performing Asdiv, the transmitter device may evaluate one or more metrics to determine which antenna or antenna switching configuration to select, of a plurality of available antennas or antenna switching configurations. For example, the transmitter device may determine one or more of a reference signal received power (RSRP), a signal to noise ratio (SNR), a transmit power headroom (e.g., which may be determined with respect to a maximum transmit power on a per antenna basis), an excess transmit power timing parameter (e.g., a percentage of time that a transmit power of an antenna exceeds a transmit power threshold, such as a maximum transmit power threshold), a sensor parameter (e.g., a proximity sensor may receive or detect input or sensor data that may be used to identify whether a user's hand or head or another object is covering an antenna), or another specified input, among other examples.

As an example of a specified threshold, a transmitter device may be required (e.g., by a regulatory body) to comply with a specific absorption rate (SAR) threshold. The SAR threshold may be a maximum power absorbed per unit mass of tissue (e.g., in milliwatts per gram (mW/g). To comply with the SAR threshold or power density (PD) threshold (e.g., in mW per square centimeter (mW/cm$^2$)), the transmitter device may limit a maximum transmit power when transmitting in close proximity of, for example, a human user. In some cases, the transmitter device may limit a maximum transmit power to comply with a combined exposure metric (e.g., an exposure metric that, for example, combines SAR and power density, such as may occur in multi-mode transmitting). When performing Asdiv, the transmitter device may use a static transmit limit based on a measured SAR or power density for an antenna, to evaluate the antenna for use. The static transmit limit may be defined on a per technology basis, a per band basis, a per device state index (DSI) basis (e.g., a different transmit limit may be used, depending on a device orientation or a presence of a user's hand as determined using proximity sensors, accelerometers, or gyroscopic sensors, among other examples), or a per antenna basis, among other examples. The transmitter device may limit an antenna transmit power to comply with an SAR threshold or power density threshold, which may be respectively termed an SAR backoff procedure or a power density reduction procedure. For example, when a transmitter device has a maximum transmit power of 23 decibel-mW (dBm), then the transmitter device may apply an SAR backoff value of 2 dBm to cause a post-SAR backoff maximum transmit power to be at a maximum of 21 dBm.

However, use of a static SAR limit or a static power density limit for Asdiv evaluation of antenna switching configurations may result in excessive SAR backoff or power density reduction during situations when such SAR backoff or power density reduction is unnecessary. Some aspects described herein may use time-averaging for an SAR limit. However, using a static power limit with time-averaged metrics may result in a failure to account for changes in the time-averaged metrics when selecting an antenna switching configuration. Some aspects described herein may introduce a time-averaged power limit to account for time-averaging of metrics, such as SAR for radio frequency bands at less than 6 GHz or power density for radio frequency bands at greater than 6 GHz or a combination of both SAR and power density during concurrent mmWave operations at a plurality of radio frequency bands. In this way, the time-averaged power limit, used in Asdiv to select an antenna switching configuration, may update, based on an update to a time-averaged metric after expiration of a time-averaging window for the time-averaged metric. In this way, the UE may improve antenna selection while complying with, for example, an SAR threshold, thereby enabling improved connectivity for the transmitter device.

For example, real-time SAR (RT-SAR) or smart transmit (STX) procedures may be introduced in which the transmitter device determines a time-averaged SAR across a time-averaging window. In this case, the transmitter device may determine an RT-SAR value based at least in part on measurements of past transmitter device power levels relative to radio frequency (RF) exposure limits set by, for example, a regulatory body, a standard, or a selected configuration, among other examples.

When time-averaging an SAR to determine an RT-SAR value, the transmitter device may determine a maximum allowable transmit power ($P_{Limit}$) in a time window ($T_{RT-SAR\_Window}$). The time-averaged RT-SAR value provides a budget with respect to SAR values that can be used to determine the allowed $P_{Limit}$. Based on RT-SAR being time-averaged, the Plimit is time-averaged. A SAR-based procedure provides a limit on how much power an antenna is allowed to transmit to meet SAR limits. As different antennas, based on the different antennas respective proximities to a person can have different SAR limits, an Asdiv antenna switching-based determination, as described herein, enables use of the different SAR limits to optimize transmit power without exceeding SAR limits. Based on SAR being time-averaged to determine the RT-SAR value and a corresponding time averaged $P_{Limit}$ for each antenna, an Asdiv antenna switching procedure can use accurate time-average $P_{Limit}$ values in antenna switching decisions for Asdiv.

The transmitter device may use the RT-SAR $P_{Limit}$ value and/or a similar power density $P_{Limit}$ value to update respective $P_{Limit}$ values for each antenna in a active operating RF-band or RAT. Using the $P_{Limit}$ value to control transmit antennas is a passive approach (e.g., based on measurement) in contrast to using, for example, a power headroom (PHR), which is an active approach (e.g., based on active or ongoing transmissions with corresponding transmit powers) to control transmit antennas. The transmitter device may evaluate an Asdiv algorithm to select an antenna switching configuration using the $P_{Limit}$ value, an RSRP, an SNR, a transmit PHR, a percentage of time that a transmit power exceeds a maximum transmit power, or a sensor input, as described above. Although some aspects are described in terms of an SAR threshold, other time-averaged power limits may be used, such as time-averaged power limits relating to power density, among other examples.

Figure 4A:
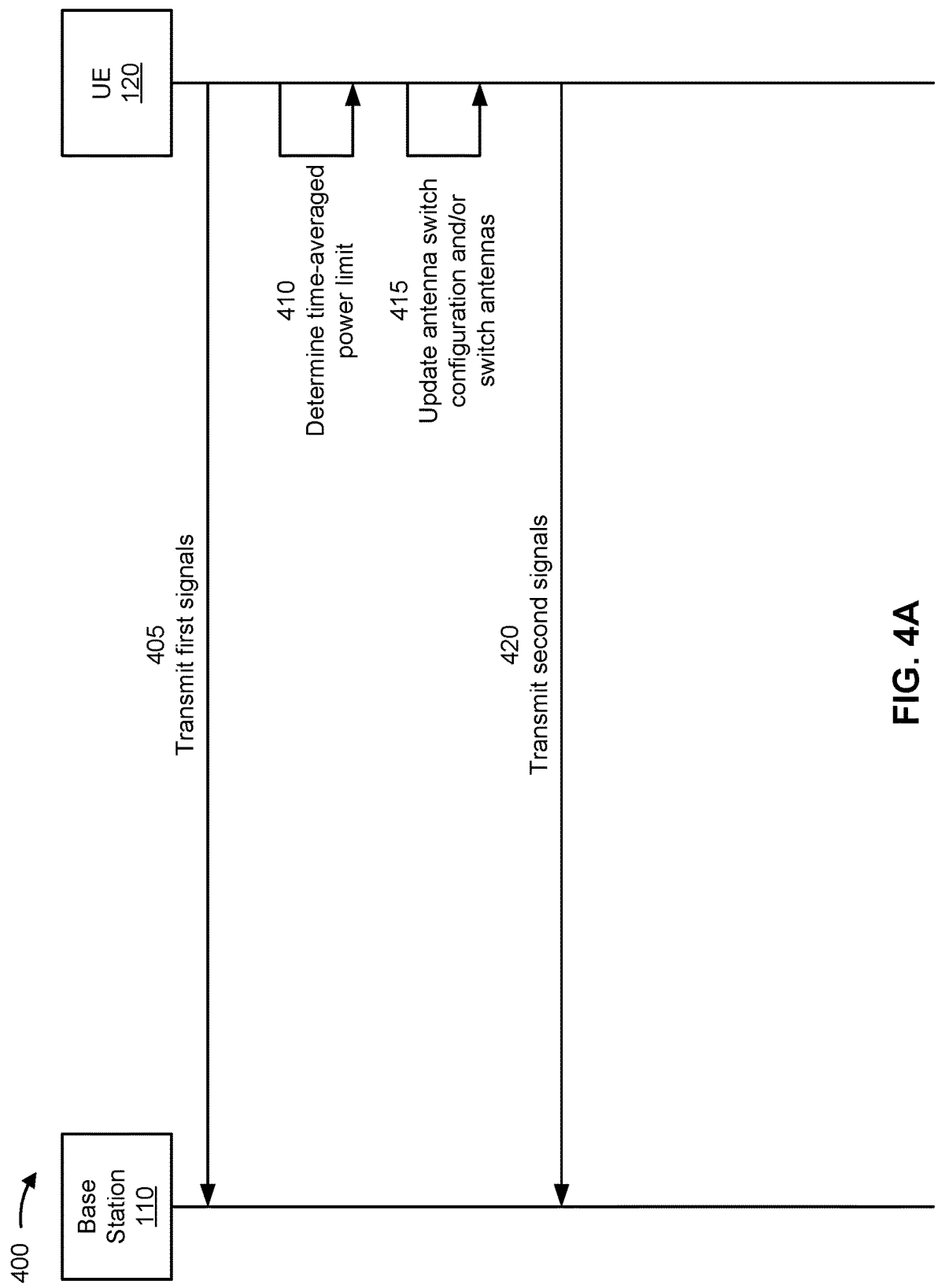
FIGS. 4A-4C are diagrams illustrating examples associated with antenna switched diversity management, in accordance with the present disclosure.
Figure 4B:
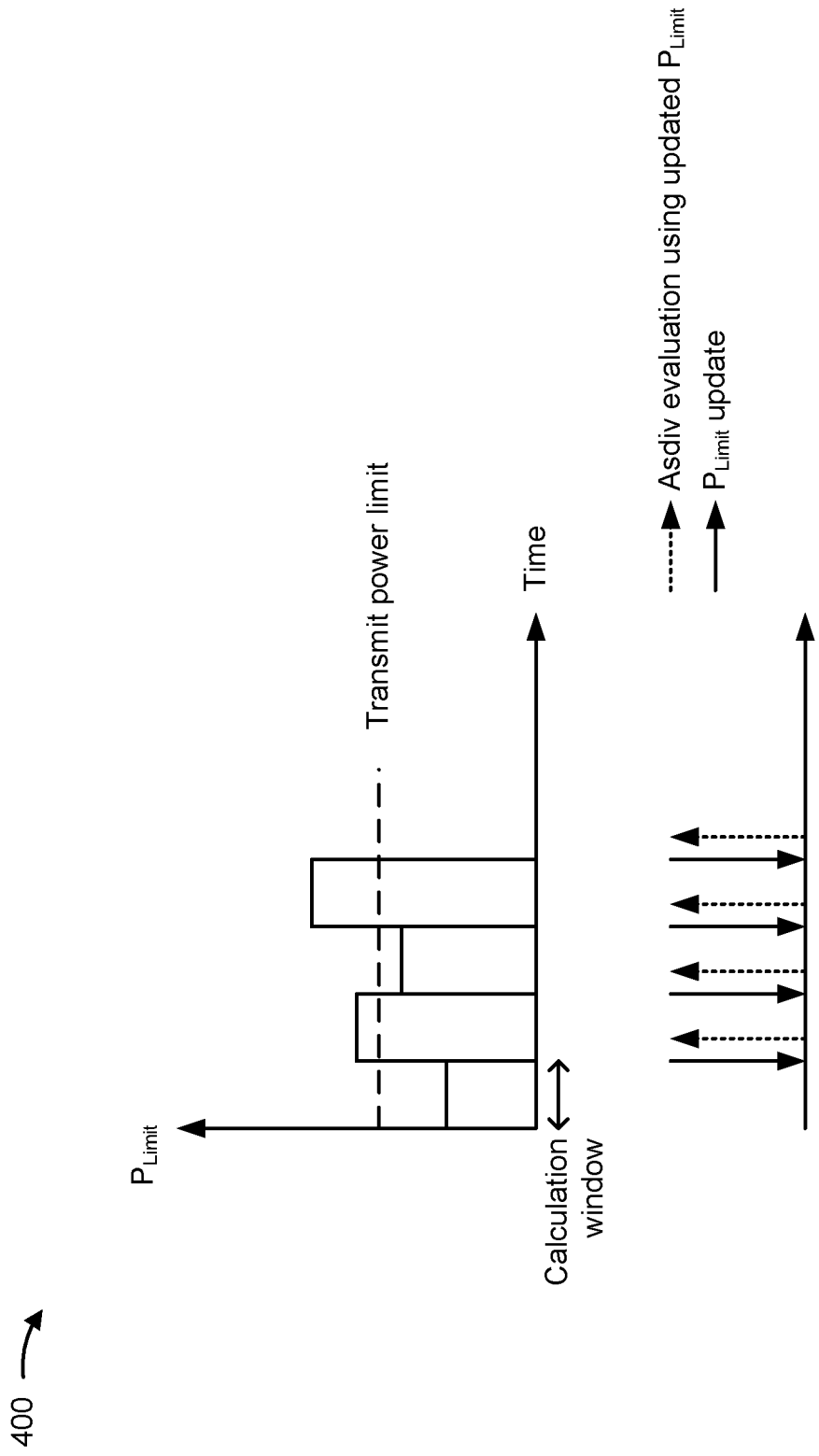
Figure 4C:
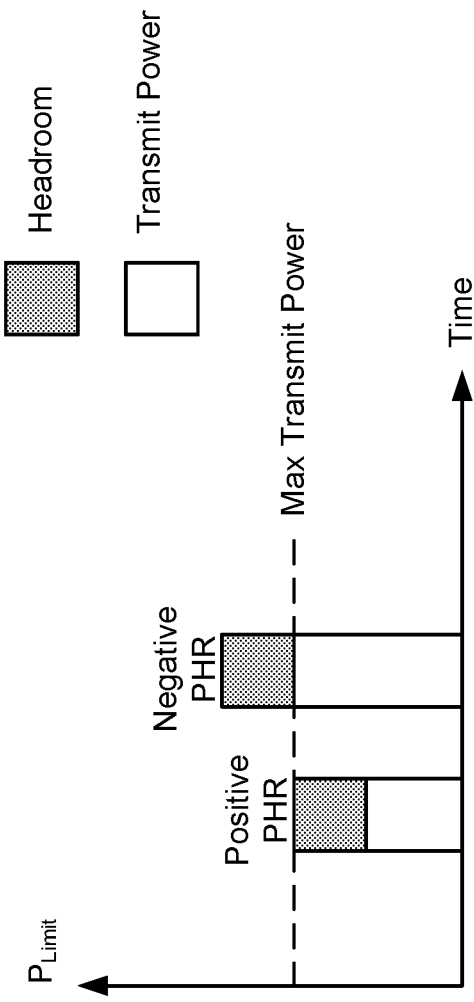

FIGS. 4A-4C are diagrams illustrating an example 400 associated with antenna switched diversity management, in accordance with the present disclosure. As shown in FIG. 4A, a base station 110 and a UE 120 (e.g., a transmitter device) may communicate with one another. Although some aspects are described herein in terms of a transmitter device being a UE, the transmitter device may be another type of transmitter device, such as a base station, among other examples.

As further shown in FIG. 4A, and by reference number 405, UE 120 may transmit first signals to base station 110. For example, UE 120 may select an antenna using a first antenna switching configuration, and may transmit the first signals to base station 110 using the first antenna switching configuration.

As further shown in FIG. 4A, and by reference numbers 410 and 415, UE 120 may determine a SAR limit using a time-averaged power limit (e.g., the SAR limit is based at least in part on a transmit power limit, which is based at least in part on a measured SAR for one or more antennas) and may update an antenna switching configuration (e.g., which may include switching antennas). An antenna switching configuration may include a selection of an antenna or one or more rules for selecting or switching antennas. For example, UE 120 may switch antennas, in accordance with an antenna switching configuration, when a first antenna that UE 120 is using does not satisfy one or more criteria of the antenna switching configuration, but a second antenna, that UE 120 is not using does satisfy the one or more criteria. In other words, UE 120 uses an antenna switching configuration that takes into account SAR based on time-averaged $P_{Limit}$ values, rather than using an antenna switching configuration that only uses other time-averaged antenna metrics, such as channel quality metrics.

In some aspects, UE 120 may determine an RT-SAR $P_{Limit}$ for a $T_{RT\text{-}SAR\_Window}$. The RT-SAR $P_{Limit}$ may be determined for operation in sub-6 GHz operating radio frequency (RF) bands. The $P_{Limit}$ may represent an RT-SAR transmit power limit determined based at least in part on one or more RT-SAR real-time exposure estimates or exposure determinations for operation in the sub-6 GHz operating RF bands. Additionally, or alternatively, UE 120 may determine a power density (PD) $P_{Limit}$ for a $T_{PD\_Window}$. The PD $P_{Limit}$ may be determined for operation in above-6 GHz operating RF bands. For example, UE 120 may determine the $P_{Limit}$ by averaging a transmit power limit for an allowed SAR exposure or PD in a $T_{RT\text{-}SAR\_Window}$ or a $T_{PD\_Window}$, respectively. In this case, UE 120 may determine the $P_{Limit}$ on a per RF-band, per RAT, per DSI, or per antenna basis, among other examples.

In some aspects, UE 120 may determine the $P_{Limit}$ for a plurality of different antennas. For example, UE 120 may determine the $P_{Limit}$ for an active antenna (e.g., an antenna which was selected using the antenna switching configuration) or a non-active antenna (e.g., an antenna which was deselected using the antenna switching configuration) that are both associated with a common RF-band or RAT. In this case, UE 120 may use an application programming interface (API) of an RT-SAR component (e.g., the $P_{Limit}$ determination component 808 of FIG. 8) to obtain the $P_{Limit}$ for use with an Asdiv component (e.g., the Asdiv evaluation component 810 of FIG. 8). As described above, although some aspects are described in terms of RT-SAR, aspects may apply to other power limits. For example, UE 120 may determine the $P_{Limit}$ for a power density procedure, among other examples.

In some aspects, UE 120 may reconfigure a measurement configuration based at least in part on a result of evaluating a time-averaged power limit (e.g., $P_{Limit}$). For example, UE 120 may determine that $P_{Limit}$ for an active antenna has changed by a threshold amount relative to a previous $P_{Limit}$ for the active antenna. In some implementations, the $P_{Limit}$ may chage as a result of a presence of a relatively large amount of data activity with high transmit power usage occurring during a first time window and then a relatively small (or no) amount of data activity occurring during a second time window. Additionally, or alternatively, the $P_{Limit}$ may change based on a user altering a position of UE 120 (e.g., from relatively close to the user to relatively far from the user) and UE 120 detecting the altered position. In this case, UE 120 may determine to change a frequency of measurements used for Asdiv evaluation, such as RSRP measurements, SNR measurements, and/or the like. In this way, UE 120 may, for example, increase a frequency of measurements to account for a more rapid change in the $P_{Limit}$, thereby ensuring faster antenna switching to comply with the $P_{Limit}$.

As shown in FIG. 4B, UE 120 may determine the $P_{Limit}$ as an iterative process. For example, after a time window has elapsed (e.g., $T_{RT\text{-}SAR\_Window}$ or $T_{PD\_Window}$), UE 120 may obtain a $P_{Limit}$ update from the RT-SAR component (e.g., using an API as described above) and may use an Asdiv component to evaluate an antenna switching configurating using the updated $P_{Limit}$. In this case, UE 120 may repeat the Asdiv component evaluation for each time window. In another example, UE 120 may repeat the Asdiv component calculation using a different periodicity than the time window for updating the $P_{Limit}$. For example, UE 120 may update the antenna switching configuration using the Asdiv component when the $P_{Limit}$ changes by a threshold amount (e.g., UE 120 may skip determination of an updated antenna switching configuration when a change to the $P_{Limit}$ is less than the threshold amount). Although some examples are described in terms of a time-averaged RT-SAR value (e.g., for a less than 6 GHz operating band), other time-averaged parameters may be possible, such as a time-averaged power density (PD) value (e.g., for a mmWave RAT of a greater than 6 GHz operating band), or a combination of an RT-SAR value and a PD value, among other examples.

As an example of determining the antenna switching configuration using the Asdiv component, UE 120 may evaluate antennas for UE 120 using the Asdiv component and based at least in part on RSRP measurements and an updated $P_{Limit}$ from an RT-SAR component. For example, UE 120 may perform RSRP measurements using antennas of UE 120 (e.g., antennas for RATs in an active RF-band, which UE 120 may filter and evaluate for Asdiv switching periodically). In this case, UE 120 may determine a delta value representing a difference between a transmit power limit of an active antenna and a transmit power limit of a target candidate antenna, where a higher transmit power limit biases selection toward an associated antenna. Further, UE 120 may determine whether a difference between an RSRP of the target candidate antenna and an RSRP of the active antenna exceeds a sum of an RSRP threshold and the delta value. If true (if the sum is exceeded), UE 120 may select the RSRP of the target candidate antenna as the selected RSRP and the associated target candidate antenna as an antenna to which to switch. Similarly, UE 120 may select a power headroom of the target candidate antenna based at least in part on a selection criterion (as illustrated in FIG. 4C, by convention, power headroom may be positive when a transmit power is less than a maximum transmit power, and negative when the transmit power is greater than the maximum transmit power). In a case where an antenna is not being used for packet transmission, UE 120 may estimate a power headroom (which may be termed a "virtual power headroom" or "virtual PHR") based at least in part on a pathloss component estimation, a modulation and coding scheme type (e.g., a specified value), a downlink pathloss factor (e.g., which may be derived from an RSRP measurement), among other examples of parameters. Additionally, or alternatively, UE 120 may determine whether one or more other metrics are selected metrics that satisfy a selection criterion, based on comparing a metric for the target candidate antenna and the metric for the active antenna with a threshold and the delta value derived from a time-averaged power limit (e.g., $P_{Limit}$). In this case, when a selection criterion relating to the aforementioned parameters is satisfied, as described in more detail herein, UE 120 may select a metric as a selected metric and may select an associated antenna as a selected antenna.

Based at least in part on identifying one or more selected metrics, UE 120 may select an antenna (e.g., using a single metric, a plurality of weighted metrics, etc.) and may determine to switch to the selected antenna. For example, UE 120 may use the antenna switching configuration, as described above with regard to FIG. 2, to switch antennas and reconfigure corresponding Tx/Rx chains (e.g., that may be impacted as a result of sharing the antenna within a common RF-band or RAT or a different RF-band or RAT).

As further shown in FIG. 4A, and by reference number 420, UE 120 may transmit second signals to base station 110. For example, based at least in part on determining a second antenna switching configuration, UE 120 may select an antenna using the second antenna switching configuration and may transmit the second signals to base station 110 using the second antenna switching configuration.

As indicated above, FIGS. 4A-4C are provided as an example. Other examples may differ from what is described with respect to FIGS. 4A-4C.

FIG. 5 is a diagram illustrating an example process 500 performed, for example, by a transmitter device, in accordance with the present disclosure. Example process 500 is an example where the transmitter device (e.g., UE 120) performs operations associated with antenna switched diversity management.

As shown in FIG. 5, in some aspects, process 500 may include determining a time-averaged power limit for each antenna of a set of antennas (block 510). For example, the transmitter device (e.g., using $P_{Limit}$ determination component 808, depicted in FIG. 8) may determine a time-averaged power limit for each antenna of a set of antennas, as described above.

As further shown in FIG. 5, in some aspects, process 500 may include modifying an antenna switching configuration based at least in part on the time-averaged power limit (block 520). For example, the transmitter device (e.g., using Asdiv evaluation component 810, depicted in FIG. 8) may modify an antenna switching configuration based at least in part on the time-averaged power limit, as described above.

As further shown in FIG. 5, in some aspects, process 500 may include transmitting a signal using an antenna, from the set of antennas, based at least in part on the modified antenna switching configuration, wherein the antenna is associated with a higher power limit than one or more other antennas from the set of antennas (block 530). For example, the transmitter device (e.g., using transmission component 804, depicted in FIG. 8) may transmit a signal using an antenna, from the set of antennas, based at least in part on the modified antenna switching configuration, as described above. In some aspects, the antenna is associated with a higher power limit than one or more other antennas from the set of antennas.

Process 500 may include additional aspects, such as any single aspect or any combination of aspects described below and/or in connection with one or more other processes described elsewhere herein.

In a first aspect, the time-averaged power limit is a real-time specific absorption ratio (RT-SAR) power limit.

In a second aspect, alone or in combination with the first aspect, the time-averaged power limit is determined on at least one of a per antenna basis, a per radio frequency band basis, a per device state index basis, or a per radio technology basis.

In a third aspect, alone or in combination with one or more of the first and second aspects, process 500 includes selecting the antenna, using the modified antenna switching configuration, based at least in part on one or more antenna parameters, wherein the one or more antenna parameters include at least one of a reference signal received power, a signal to noise ratio, a transmit power headroom, a maximum transmit power, an excess transmit power timing parameter, a sensor parameter, or the time-averaged power limit.

In a fourth aspect, alone or in combination with one or more of the first through third aspects, the determination of the time-averaged power limit comprises determining the time-averaged power limit based at least in part on a time-averaged exposure determination.

In a fifth aspect, alone or in combination with one or more of the first through fourth aspects, the time-averaged exposure determination is determined for a time window associated with the time-averaged power limit.

In a sixth aspect, alone or in combination with one or more of the first through fifth aspects, the determination of the time-averaged power limit comprises determining the time-averaged power limit for at least one of the transmit antenna of the transmitter device or the one or more other antennas of the transmitter device, wherein the antenna and the one or more other antennas are associated with a common radio frequency band of the transmitter device.

In a seventh aspect, alone or in combination with one or more of the first through sixth aspects, the time-averaged power limit is re-determined for each new time window.

In an eighth aspect, alone or in combination with one or more of the first through seventh aspects, process 500 includes switching, based at least in part on the modified antenna switching configuration, from the one or more other antennas associated with a lower power limit to the antenna associated with the higher power limit; and reconfiguring, based at least in part on the modified antenna switching configuration, a transmit chain or a receive chain corresponding to the one or more other antennas or to the antenna.

In a ninth aspect, alone or in combination with one or more of the first through eighth aspects, process 500 includes determining that the time-averaged power limit differs from a previous time-averaged power limit by a threshold amount, and altering a measurement frequency based at least in part on the determination that the time-averaged power limit differs from the previous time-averaged power limit by the threshold amount.

In a tenth aspect, alone or in combination with one or more of the first through ninth aspects, the measurement frequency is for at least one of a reference signal received power measurement or a signal to noise ratio measurement.

In an eleventh aspect, alone or in combination with one or more of the first through tenth aspects, process 500 includes switching, in accordance with the modified antenna switching configuration, to the antenna from another antenna with a lower power limit than the antenna.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
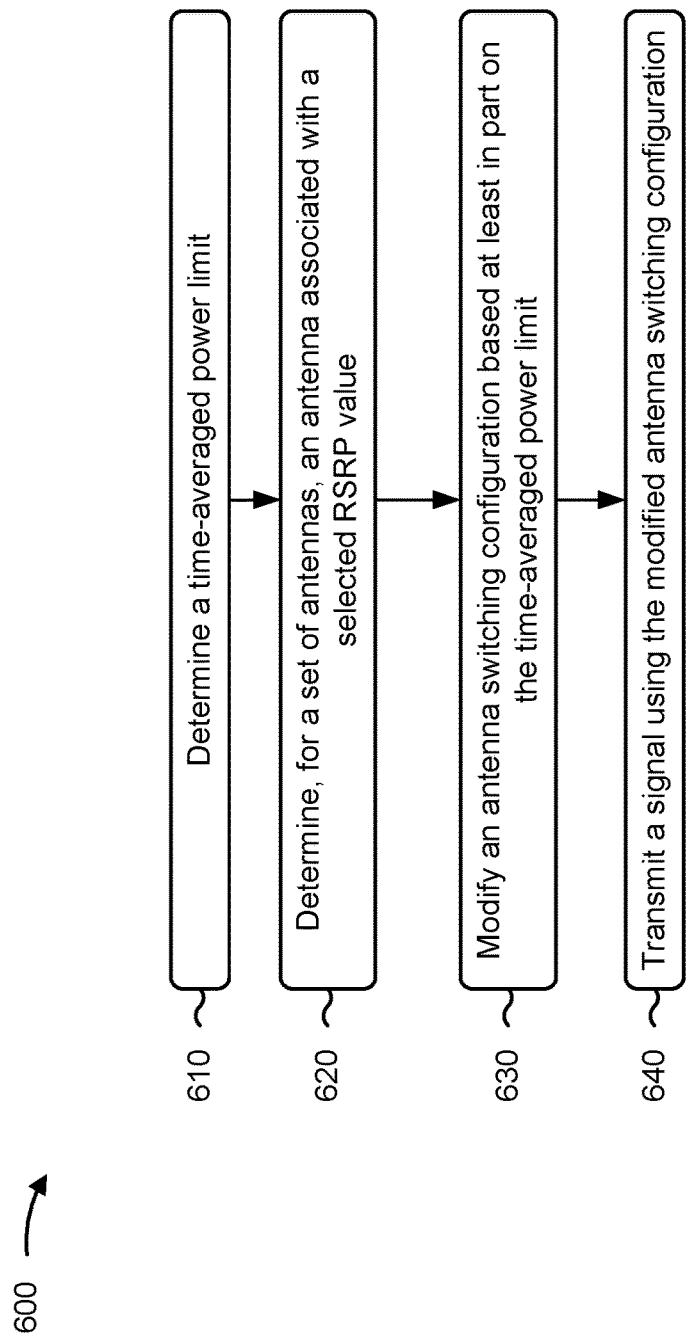

FIG. 6 is a diagram illustrating an example process 600 performed, for example, by a transmitter device, in accordance with the present disclosure. Example process 600 is an example where the transmitter device (e.g., UE 120) performs operations associated with antenna switched diversity management.

As shown in FIG. 6, in some aspects, process 600 may include determining a time-averaged power limit (block 610). For example, the transmitter device (e.g., using $P_{Limit}$ determination component 808, depicted in FIG. 8) may determine a value for $P_{Limit}$ and may determine a delta value based at least in part on $P_{Limit}$. In this case, the transmitter device may determine the delta value, $P_{Limit\_Delta} = P_{Limit\_Current} - P_{Limit\_Target}$, where $P_{Limit\_Current}$ represents a value of $P_{Limit}$ for a current antenna and $P_{Limit\_Target}$ represents a value of $P_{Limit}$ for a target antenna. In some aspects, the transmitter device may determine $P_{Limit\_Delta}$ for each of a plurality of target antennas that the transmitter device is to consider for switching.

As shown in FIG. 6, in some aspects, process 600 may include determining, for a set of antennas, an antenna associated with a selected RSRP value (block 620). For example, the transmitter device (e.g., using Asdiv evaluation component 810, depicted in FIG. 8) may determine, for a set of antennas, an antenna associated with a selected RSRP value. In this case, the transmitter device may determine whether a selection criterion is satisfied. For example, the transmitter device may determine whether $RSRP_{Target} - RSRP_{Current} > RSRP_{Threshold} + P_{Limit\_Delta}$, where $RSRP_{Target}$ represents an RSRP of a target antenna, $RSRP_{Current}$ represents an RSRP of a current antenna, and $RSRP_{Threshold}$ represents a configurable threshold parameter. In this case, when the selection criterion evaluates to true, the transmitter device may select the RSRP of the target antenna as a selected RSRP and may select an associated antenna as a selected antenna. In some aspects, the transmitter device may evaluate the selection criterion for each possible target antenna.

As further shown in FIG. 6, in some aspects, process 600 may include modifying an antenna switching configuration based at least in part on the time-averaged power limit (block 630). For example, the transmitter device (e.g., using Asdiv evaluation component 810, depicted in FIG. 8) may modify an antenna switching configuration based at least in part on the time-averaged power limit, as described above. In some aspects, the transmitter device may select an antenna for transmission that is associated with the selected RSRP available. For example, based at least in part on evaluating the selection criterion, the transmitter device may select a new antenna as the current antenna and may reconfigure a transmit chain to use the new antenna, as described above. In some aspects, the transmitter device may select the antenna based at least in part on a plurality of factors, such as based at least in part on the selected RSRP, another parameter, another selection criterion, and/or the like.

As further shown in FIG. 6, in some aspects, process 600 may include transmitting a signal using the modified antenna switching configuration (block 640). For example, the transmitter device (e.g., using transmission component 804, depicted in FIG. 8) may transmit a signal using the modified antenna switching configuration, as described above. In this case, the transmitter device may transmit a signal using a selected target antenna, as described above.

Process 600 may include additional aspects, such as any single aspect or any combination of aspects described in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
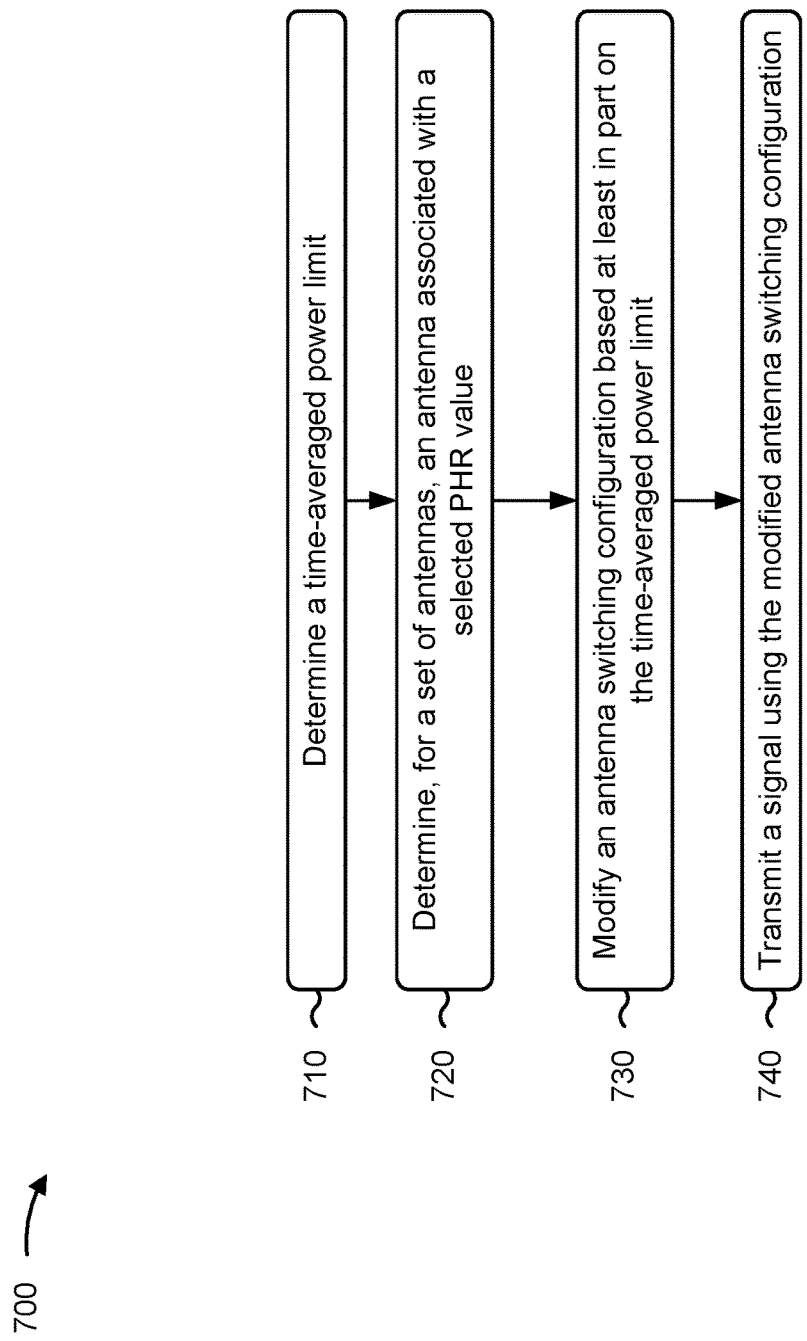

FIG. 7 is a diagram illustrating an example process 700 performed, for example, by a transmitter device, in accordance with the present disclosure. Example process 700 is an example where the transmitter device (e.g., UE 120) performs operations associated with antenna switched diversity management.

As shown in FIG. 7, in some aspects, process 700 may include determining a time-averaged power limit (block 710). For example, the transmitter device (e.g., using $P_{Limit}$ determination component 808, depicted in FIG. 8) may determine a value for $P_{Limit}$ and may determine a delta value based at least in part on $P_{Limit}$. In this case, the transmitter device may determine the delta value, $P_{Limit\_Delta} = P_{Limit\_Current} - P_{Limit\_Target}$, where $P_{Limit\_Current}$ represents a value of $P_{Limit}$ for a current antenna and $P_{Limit\_Target}$ represents a value of $P_{Limit}$ for a target antenna. In some aspects, the transmitter device may determine $P_{Limit\_Delta}$ for each of a plurality of target antennas that the transmitter device is to consider for switching.

As shown in FIG. 7, in some aspects, process 700 may include determining, for a set of antennas, an antenna associated with a selected power headroom (PHR) value (block 720). For example, the transmitter device (e.g., using Asdiv evaluation component 810, depicted in FIG. 8) may determine, for a set of antennas, an antenna associated with a selected PHR value. In this case, the transmitter device may determine whether a selection criterion is satisfied. For example, the transmitter device may determine whether $PHR_{Target} - PHR_{Current} > PHR_{Threshold} + P_{Limit\_Delta}$, where $PHR_{Target}$ represents a PHR of a target antenna, $PHR_{Current}$ represents a PHR of a current antenna, and $PHR_{Threshold}$ represents a configurable threshold parameter. In this case, when the selection criterion evaluates to true, the transmitter device may select the PHR value of the target antenna as a selected PHR value and may select an associated target antenna as a selected antenna. In some aspects, the transmitter device may evaluate the selection criterion for each possible target antenna.

As further shown in FIG. 7, in some aspects, process 700 may include modifying an antenna switching configuration based at least in part on the time-averaged power limit (block 730). For example, the transmitter device (e.g., using Asdiv evaluation component 810, depicted in FIG. 8) may modify an antenna switching configuration based at least in part on the time-averaged power limit, as described above. In some aspects, the transmitter device may select an antenna for transmission that is associated with the selected PHR. For example, based at least in part on evaluating the selection criterion, the transmitter device may select a new antenna as the current antenna and may reconfigure a transmit chain to use the new antenna, as described above. In some aspects, the transmitter device may select the antenna based at least in part on a plurality of factors, such as based at least in part on the selected PHR, another parameter, another selection criterion, and/or the like.

As further shown in FIG. 7, in some aspects, process 700 may include transmitting a signal using the modified antenna switching configuration (block 740). For example, the transmitter device (e.g., using transmission component 804, depicted in FIG. 8) may transmit a signal using the modified antenna switching configuration, as described above. In this case, the transmitter device may transmit a signal using a selected target antenna, as described above.

Process 700 may include additional aspects, such as any single aspect or any combination of aspects described in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
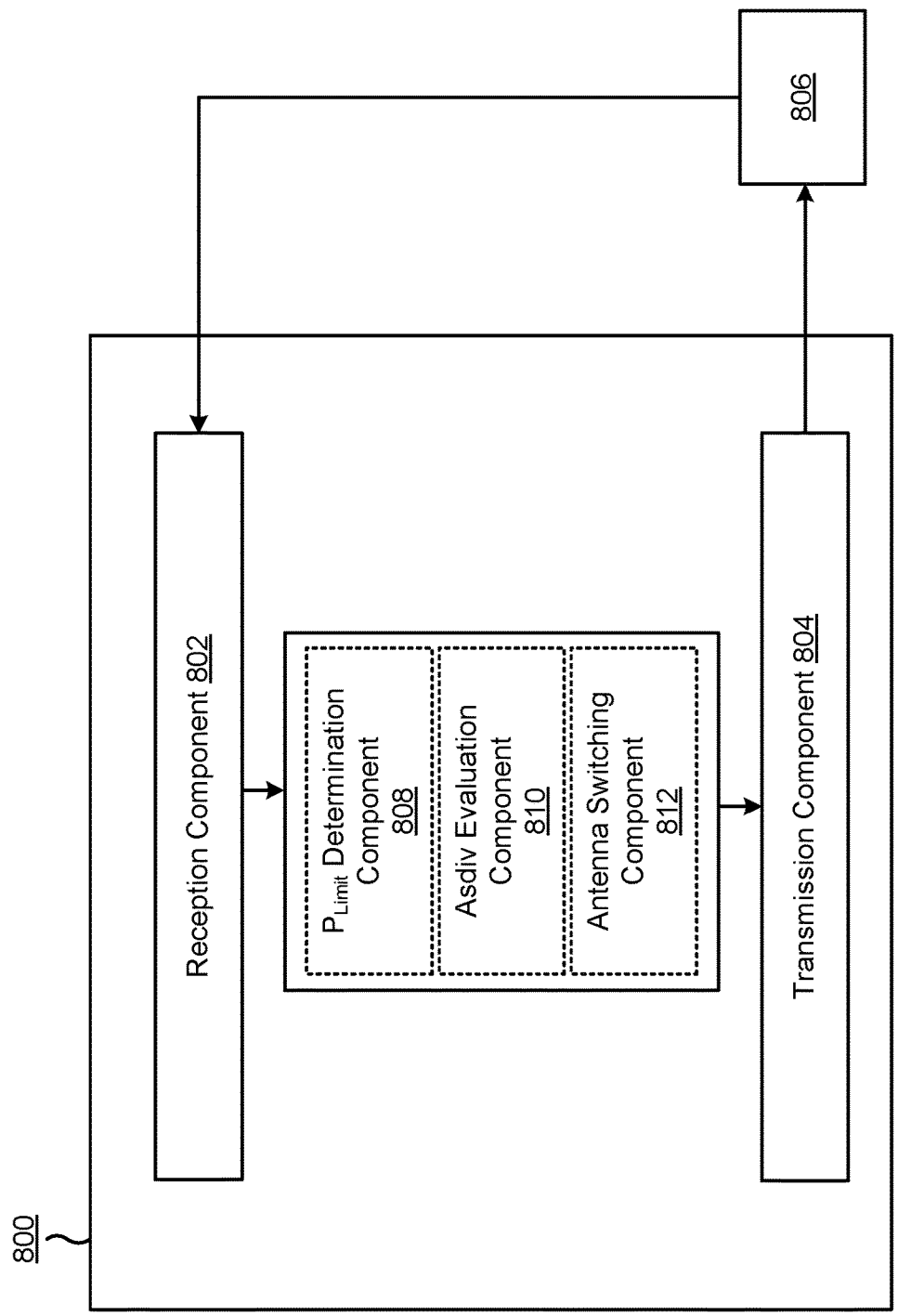
FIG. 8 is a block diagram of an example apparatus for wireless communication, in accordance with the present disclosure.

FIG. 8 is a block diagram of an example apparatus 800 for wireless communication. The apparatus 800 may be a transmitter device, or a transmitter device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component

804. As further shown, the apparatus 800 may include one or more of a $P_{Limit}$ determination component 808, an Asdiv evaluation component 810, or an antenna switching component 812, among other examples.

In some aspects, the apparatus 800 may be configured to perform one or more operations described herein in connection with FIGS. 4A-4C. Additionally or alternatively, the apparatus 800 may be configured to perform one or more processes described herein, such as process 500 of FIG. 5, process 600 of FIG. 6, or process 700 of FIG. 7, among other examples. In some aspects, the apparatus 800 and/or one or more components shown in FIG. 8 may include one or more components of the transmitter device described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the transmitter device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the transmitter device described above in connection with FIG. 2. In some aspects, the transmission component 804 may be co-located with the reception component 802 in a transceiver.

The $P_{Limit}$ determination component 808 may determine a time-averaged power limit. The $P_{Limit}$ determination component 808 may determine that the time-averaged power limit differs from a previous time-averaged power limit by a threshold amount. The $P_{Limit}$ determination component 808 may alter a measurement frequency based at least in part on the determination that the time-averaged power limit differs from the previous time-averaged power limit by the threshold amount. In some aspects, the $P_{Limit}$ determination component 808 may include one or more antennas, a demodulator, a MIMO detector, a receive processor, a modulator, a transmit MIMO processor, a transmit processor, a controller/processor, a memory, or a combination thereof, of the transmitter device described above in connection with FIG. 2.

The Asdiv evaluation component 810 may modify an antenna switching configuration based at least in part on the time-averaged power limit. In some aspects, the Asdiv evaluation component 810 may include one or more antennas, a demodulator, a MIMO detector, a receive processor, a modulator, a transmit MIMO processor, a transmit processor, a controller/processor, a memory, or a combination thereof, of the transmitter device described above in connection with FIG. 2. The transmission component 804 may transmit a signal using the modified antenna switching configuration.

The antenna switching component 812 may select an antenna, using the modified antenna switching configuration, based at least in part on one or more antenna parameters, where the one or more antenna parameters include at least one of a reference signal received power, a signal to noise ratio, a transmit power headroom, a maximum transmit power, an excess transmit power timing parameter, a sensor parameter, or the time-averaged power limit. The antenna switching component 812 may determine to switch antennas based at least in part on the modified antenna switching configuration. The antenna switching component 812 may cause a radio frequency apparatus to reconfigure to switch antennas and corresponding transmit/receive chains based at least in part on the determination to switch antennas. In some aspects, the antenna switching component 812 may include one or more antennas, a demodulator, a MIMO detector, a receive processor, a modulator, a transmit MIMO processor, a transmit processor, a controller/processor, a memory, or a combination thereof, of the transmitter device described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a apparatus, comprising: determining a time-averaged power limit for each antenna of a set of antennas; modifying an antenna switching configuration based at least in part on the time-averaged power limit; and transmitting a signal using an antenna, from the set of antennas, based at least in part on the modified antenna switching configuration, wherein the antenna is associated with a higher time-averaged power limit than one or more other antennas from the set of antennas.

Aspect 2: The method of Aspect 1, wherein modifying the antenna switching configuration comprises: switching, based at least in part on the modified antenna switching configuration, from the one or more other antennas associated with a lower time-averaged power limit to the antenna associated with the higher time-averaged power limit.

Aspect 3: The method of any of Aspects 1 to 2, wherein switching from the one or more other antennas to the antenna comprises: reconfiguring, based at least in part on the modified antenna switching configuration, a transmit chain or a receive chain corresponding to the one or more other antennas or to the antenna.

Aspect 4: The method of any of Aspects 1 to 3, wherein the time-averaged power limit is at least one of a real-time specific absorption ratio (RT-SAR) power limit or a power density (PD) power limit.

Aspect 5: The method of any of Aspects 1 to 4, wherein the time-averaged power limit is determined based at least in part on one of: a per antenna basis, a per radio frequency band basis, a per device state index basis, or a per radio technology basis.

Aspect 6: The method of any of Aspects 1 to 5, wherein modifying the antenna switching configuration comprises: selecting the antenna switching configuration based at least in part on one or more antenna parameters, wherein the one or more antenna parameters include at least one of: a reference signal received power, a signal to noise ratio, a transmit power headroom, a maximum transmit power, an excess transmit power timing parameter, a sensor parameter, or the time-averaged power limit.

Aspect 7: The method of any of Aspects 1 to 6, wherein determining the time-averaged power limit comprises: determining the time-averaged power limit based at least in part on a time-averaged exposure determination.

Aspect 8: The method of Aspect 7, wherein the time-averaged exposure determination is determined for a time window associated with the time-averaged power limit.

Aspect 9: The method of any of Aspects 1 to 8, wherein determining the time-averaged power limit comprises: determining the time-averaged power limit for at least one of: the antenna of the apparatus or the one or more other antennas of the apparatus, wherein the antenna and the one or more other antennas are associated with a common radio frequency band of the apparatus.

Aspect 10: The method of any of Aspects 1 to 9, wherein the time-averaged power limit is re-determined for each new time window.

Aspect 11: The method of any of Aspects 1 to 10, further comprising: determining that the time-averaged power limit differs from a previous time-averaged power limit by a threshold amount; and altering a measurement frequency based at least in part on the determination that the time-averaged power limit differs from the previous time-averaged power limit by the threshold amount.

Aspect 12: The method of Aspect 11, wherein the measurement frequency is for at least one of: a reference signal received power measurement or a signal to noise ratio measurement.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of a list of" items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors coupled to the memory, the one or more processors configured to:
determine that a first time-averaged power limit, associated with a first time window, for an antenna, of a set of antennas, differs by at least a threshold amount from a second time-averaged power limit, associated with a second time window, for the antenna;
modify an antenna switching configuration based at least in part on the first time-averaged power limit being different from the second time-averaged power limit by at least the threshold amount; and
transmit a signal using a first antenna, from the set of antennas, based at least in part on the modified antenna switching configuration, wherein the first antenna is associated with a higher time-averaged power limit than one or more second antennas from the set of antennas.

2. The apparatus of claim 1, wherein the one or more processors, when modifying the antenna switching configuration, are configured to:
switch, based at least in part on the modified antenna switching configuration, from the one or more second antennas associated with a lower time-averaged power limit to the first antenna associated with the higher time-averaged power limit.

3. The apparatus of claim 2, wherein the one or more processors, when switching from the one or more second antennas to the first antenna, are configured to:
reconfigure, based at least in part on the modified antenna switching configuration, a transmit chain or a receive chain corresponding to the one or more second antennas or to the first antenna.

4. The apparatus of claim 1, wherein the first time-averaged power limit is at least one of a real-time specific absorption ratio (RT-SAR) power limit or a power density (PD) power limit.

5. The apparatus of claim 1, wherein the first time-averaged power limit is determined based at least in part on one of: a per antenna basis, a per radio frequency band basis, a per device state index basis, or a per radio technology basis.

6. The apparatus of claim 1, wherein the one or more processors, when modifying the antenna switching configuration, are configured to:
select the antenna switching configuration based at least in part on one or more antenna parameters, wherein the one or more antenna parameters include at least one of:
a reference signal received power,
a signal to noise ratio,
a transmit power headroom,
a maximum transmit power,
an excess transmit power timing parameter,
a sensor parameter, or
the first time-averaged power limit.

7. The apparatus of claim 1, wherein the one or more processors are further configured to:
determine the first time-averaged power limit based at least in part on a time-averaged exposure determination.

8. The apparatus of claim 7, wherein the time-averaged exposure determination is determined for the first time window.

9. The apparatus of claim 1, wherein the one or more processors are further configured to:
determine a corresponding time-averaged power limit for each antenna of the set of antennas, wherein one or more antennas of the set of antennas are associated with a common radio frequency band of the apparatus.

10. The apparatus of claim 1, wherein a time-averaged power limit of the antenna is re-determined for each new time window.

11. The apparatus of claim 1, wherein the one or more processors are further configured to:
alter a measurement frequency based at least in part on the first time-averaged power limit differing from the second time-averaged power limit by at least the threshold amount.

12. The apparatus of claim 11, wherein the measurement frequency is for at least one of: a reference signal received power measurement or a signal to noise ratio measurement.

13. A method of wireless communication performed by an apparatus, comprising:
determining that a first time-averaged power limit, associated with a first time window, for an antenna, of a set of antennas, differs by at least a threshold amount from a second time-averaged power limit, associated with a second time window, for the antenna;
modifying an antenna switching configuration based at least in part on the first time-averaged power limit being different from the second time-averaged power limit by at least the threshold amount; and
transmitting a signal using a first antenna, from the set of antennas, based at least in part on the modified antenna switching configuration, wherein the first antenna is associated with a higher time-averaged power limit than one or more second antennas from the set of antennas.

14. The method of claim 13, wherein modifying the antenna switching configuration comprises:
switching, based at least in part on the modified antenna switching configuration, from the one or more second antennas associated with a lower time-averaged power limit to the first antenna associated with the higher time-averaged power limit.

15. The method of claim 14, wherein switching from the one or more second antennas to the first antenna comprises:
reconfiguring, based at least in part on the modified antenna switching configuration, a transmit chain or a receive chain corresponding to the one or more second antennas or to the first antenna.

16. The method of claim 13, wherein the first time-averaged power limit is at least one of a real-time specific absorption ratio (RT-SAR) power limit or a power density (PD) power limit.

17. The method of claim 13, wherein the first time-averaged power limit is determined based at least in part on one of: a per antenna basis, a per radio frequency band basis, a per device state index basis, or a per radio technology basis.

18. The method of claim 13, wherein modifying the antenna switching configuration comprises:
selecting the antenna switching configuration based at least in part on one or more antenna parameters, wherein the one or more antenna parameters include at least one of:
a reference signal received power,
a signal to noise ratio,
a transmit power headroom,
a maximum transmit power,
an excess transmit power timing parameter,
a sensor parameter, or
the first time-averaged power limit.

19. The method of claim 13, wherein determining the first time-averaged power limit comprises:
determining the first time-averaged power limit based at least in part on a time-averaged exposure determination.

20. The method of claim 19, wherein the time-averaged exposure determination is determined for the first time window.

21. The method of claim 13, comprising:
determining a corresponding time-averaged power limit for each antenna of the set of antennas, wherein one or more antennas of the set of antennas are associated with a common radio frequency band of the apparatus.

22. The method of claim 13, wherein a time-averaged power limit of the antenna is re-determined for each new time window.

23. The method of claim 13, further comprising:
altering a measurement frequency based at least in part on the first time-averaged power limit differing from the second time-averaged power limit by at least the threshold amount.

24. The method of claim 23, wherein the measurement frequency is for at least one of: a reference signal received power measurement or a signal to noise ratio measurement.

25. A non-transitory computer-readable medium storing a set of instructions for wireless communication, the set of instructions comprising:
one or more instructions that, when executed by one or more processors of an apparatus, cause the apparatus to:
determine that a first time-averaged power limit, associated with a first time window, for an antenna, of a set of antennas, differs by at least a threshold amount from a second time-averaged power limit, associated with a second time window, for the antenna;
modify an antenna switching configuration based at least in part on the first time-averaged power limit being different from the second time-averaged power limit by at least the threshold amount; and
transmit a signal using a first antenna, from the set of antennas, based at least in part on the modified antenna switching configuration, wherein the first antenna is associated with a higher time-averaged power limit than one or more second antennas from the set of antennas.

26. The non-transitory computer-readable medium of claim 25, wherein the one or more instructions, that cause the apparatus to modify the antenna switching configuration, cause the apparatus to:
switch, based at least in part on the modified antenna switching configuration, from the one or more second antennas associated with a lower time-averaged power limit to the first antenna associated with the higher time-averaged power limit.

27. The non-transitory computer-readable medium of claim 26, wherein the one or more instructions, that cause the apparatus to switch from the one or more second antennas to the first antenna, cause the apparatus to:
reconfigure, based at least in part on the modified antenna switching configuration, a transmit chain or a receive chain corresponding to the one or more second antennas or to the first antenna.

28. The non-transitory computer-readable medium of claim 25, wherein the first time-averaged power limit is at least one of a real-time specific absorption ratio (RT-SAR) power limit or a power density (PD) power limit.

29. An apparatus for wireless communication, comprising:
means for determining that a first time-averaged power limit, associated with a first time window, for an antenna, of a set of antennas, differs by at least a threshold amount from a second time-averaged power limit, associated with a second time window, for the antenna;
means for modifying an antenna switching configuration based at least in part on the first time-averaged power limit being different from the second time-averaged power limit by at least the threshold amount; and
means for transmitting a signal using a first antenna, from the set of antennas, based at least in part on the modified antenna switching configuration, wherein the first antenna is associated with a higher time-averaged power limit than one or more second antennas from the set of antennas.

30. The apparatus of claim 29, wherein the means for modifying the antenna switching configuration are configured to:
means for switching, based at least in part on the modified antenna switching configuration, from the one or more second antennas associated with a lower time-averaged power limit to the first antenna associated with the higher time-averaged power limit.

* * * * *